Figure 1:
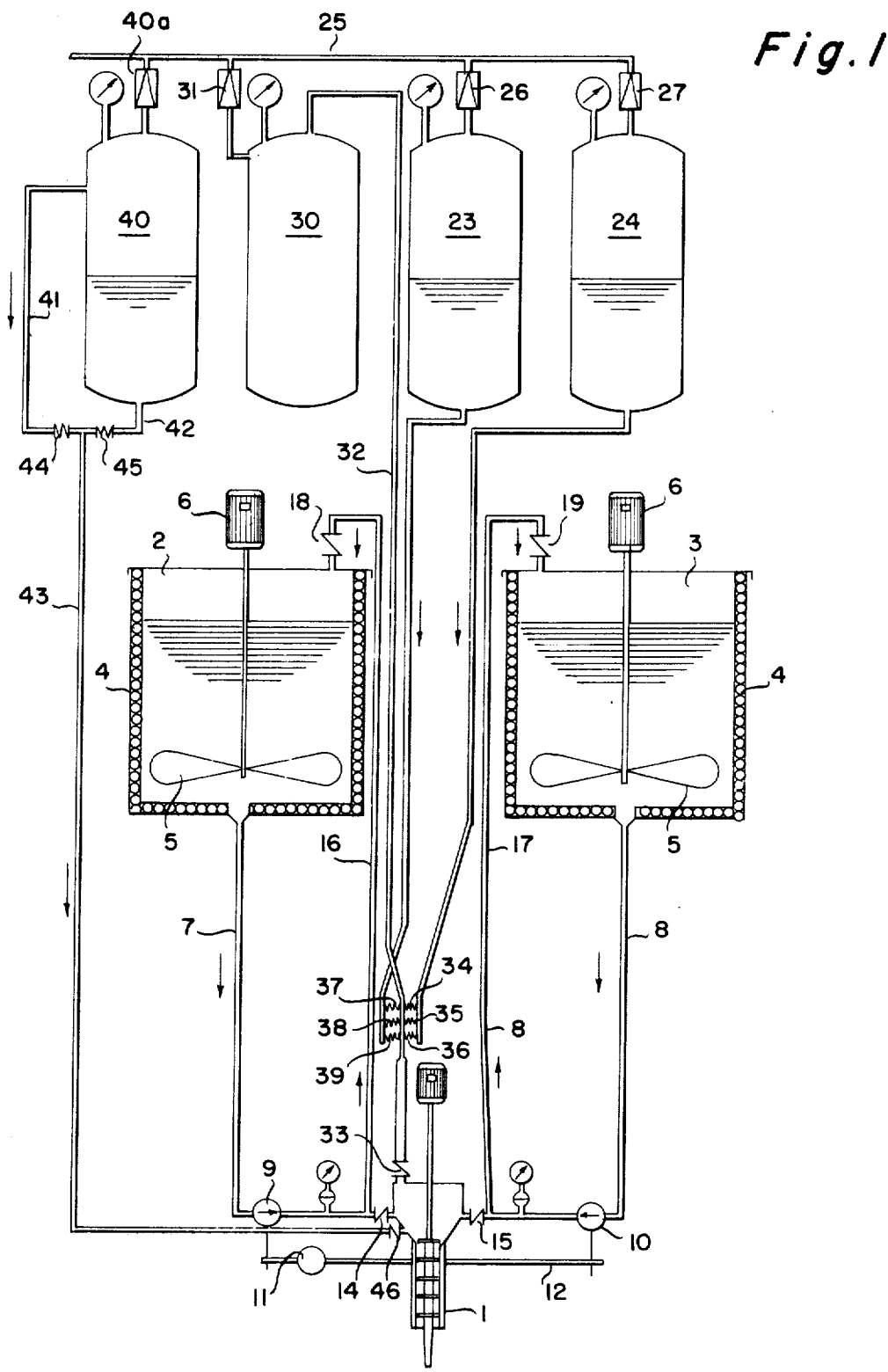

United States Patent

Contastin

[11] 3,892,389
[45] July 1, 1975

[54] DEVICE AND METHOD FOR INJECTING LIQUIDS INTO A MIXING HEAD

[75] Inventor: Andre Contastin, Severac Gare, France

[73] Assignee: N. V. Bekaert S.A., Zwevegem, Belgium

[22] Filed: Nov. 29, 1972

[21] Appl. No.: 310,562

[52] U.S. Cl. .............. 259/8; 137/604; 260/2.5 BC
[51] Int. Cl. ............................................. F16k 19/00
[58] Field of Search ............. 260/2.5 BD, 2.5 BC; 137/604; 259/7, 8, 22, 23, 24

[56] References Cited
UNITED STATES PATENTS

| | | | |
|---|---|---|---|
| 3,203,675 | 8/1965 | Ward | 259/7 |
| 3,251,092 | 5/1966 | Printz | 260/2.5 BC X |
| 3,353,797 | 11/1967 | Simonetti | 259/8 |
| 3,362,919 | 1/1968 | Rood | 260/2.5 BD X |
| 3,627,706 | 12/1971 | Chant | 260/2.5 BD |
| 3,769,232 | 10/1973 | Houlridge | 260/2.5 BC |

Primary Examiner—Robert G. Nilson
Attorney, Agent, or Firm—Arkwright, Garvey, Dinsmore & Shlesinger

[57] ABSTRACT

This invention relates to a device and a method for introducing and mixing a relatively small flow of a liquid possessing a low viscosity into a quantity of a liquid having a high viscosity, the action being turbulent with the introduction of a current of pressurized gas into said high viscosity liquid.

7 Claims, 4 Drawing Figures

DEVICE AND METHOD FOR INJECTING LIQUIDS INTO A MIXING HEAD

Materials are known, which form by hardening by reaction between the molecules of a liquid. The final composition of this liquid comprises one or more basic materials, possibly a catalyst and additives, such as stabilizing agents, coloring agents, expanding agents, cross-linking agents or others. Some of the ingredients do not react at all with one another, or only very slowly, and may be mixed before production, while others cannot be brought together until the actual time of production. These premixtures make it possible to reduce the number of constituents which have to be brought together during the final reaction.

An advantage of this is the resultant simplification in the feed and mixing system of the machines for producing a material of this type; in particular it is possible to avoid the duration of premixing being limited to the reaction time.

Thus, it is possible to distribute and to mix intimately, into the final mixture, carefully measured small quantities of substances as a result of perfect premixing of these substances into one of the constituents.

For the final mixing of the liquid constituents for the purpose of producing a substance of this type, mixing heads have been developed, shaped as a pistol or of some other suitable form, which discharge the final mixture formed into the head itself from two or more flows of liquid constituents entering through separate feed ducts, and coming together inside the mixing head.

The ducting or passage for the resultant current is furnished with the necessary means, for example a turbine, for producing turbulence, thus insuring thorough interpenetration of the ingredients before they are discharged through an outlet duct or orifice.

The turbulence in the mixing head is sometimes produced and improved by the blowing in or air; this also serves to propel the final mixture towards the discharge orifice and it is distributed in the form of bubbles in the mixture. This turbulent air mixing can only be utilized when the introduction of air bubbles is acceptable, as for example in the production of plastic foams or when making layers obtained by projecting the mixture onto a support.

The supply ducts are each connected to a supply reservoir containing one of the constituents. In order to obtain a final product having the desired quality, the constituents must be directed towards the mixing head in well-defined proportions; these proportions may be achieved by means of volumetric piston pumps, operating at the same rhythm as the mixing head but with their stroke adjustable according to the proportion desired.

In this case however, when the mixing head has to deliver successive portions of the mixture discontinuously, the volume of each portion is associated with the volume of the pumps.

Moreover, it is difficult to change the composition from one portion to another, since if this is to be done the length of stroke of the pistons has to be changed, thus necessitating a mechanical operation. There is therefore, neither flexibility in the adjustment of the volume, nor flexibility in adjusting the composition of successive portions.

Greater flexibility in regulating the volume of the portions can be obtained by pumping using gear pumps to supply the liquid to the mixing head, the speed ratio of the gear pumps being adjustable according to the proportions desired and the viscosity of the constituents.

The pumps thus operate continuously and the ingress to the mixing head is controlled by needle valves, the open period of which for each portion will depend upon the desired volume.

When the needle valves are closed, the liquid is recycled to the supply reservoir.

This latter method, which permits easy regulation of the volume of each portion, does however necessitate rigid control of the viscosity of the constituents and does not provide the same accuracy in the proportions of the mixtures. In particular, this method cannot be used when one of the constituents, possessing a low viscosity in comparison with the others, has to be introduced in a small quantity and in a rigorously fixed proportion, because small variations in the proportion could lead to excessively large fluctuations in the evolution of the chemical process or in the quality of the final product.

In fact, the turbulence in the viscous mixture then causes pressure fluctuations, at the inlet orifice for the low viscosity constituent, which exert a major influence upon the flow rate of this constituent.

It follows from this method that a constituent of low viscosity, which must be dosed into the mixture in rigorously exact proportions, can only with difficulty be injected directly into the mixing head.

If the nature of this constituent permits, it is then premixed into one of the viscous constituents. It is then however no longer possible to discharge successive portions of mixture, in which the type and proportion of this constituent vary from one portion to another, since the composition is determined by the composition of the premixture in the supply reservoir. It is then not possible to modify the proportion or to change the additive following upon the change in ambient conditions, or to produce in succession objects possessing different, predetermined properties.

The installation which makes use of gear pumps with recycling of the constituents therefore does not lead to high flexibility in adjusting the composition of the mixtures discharged, and it lacks accuracy when proportioning low viscosity products.

It is an objective of the invention to provide a method and a device for injecting in rigorously controlled proportions a low viscosity constituent into at least one other constituent, it being also possible to vary the composition discharged.

The invention can be applied equally well in installations comprising piston pumps or in those comprising gear pumps and in general, it may be used in any device for introducing and mixing a relatively small flow of a low viscosity liquid into a mass of a high viscosity liquid, with turbulence through the introduction of a gas flow under pressure into said mass.

The device according to the invention is characterized in that it comprises at least one liquid atomizer disposed in a feed duct for said gas flow, and connected to a source which supplies the flow of low viscosity liquid.

The method according to the invention is characterized in that said low viscosity liquid is introduced into said mass in the form of an aerosol in said gas flow.

In fact it is possible, instead of introducing the low viscosity liquid directly, actually to take advantage of this low viscosity and of the gas to be injected, in order to introduce the liquid in the form of an aerosol. The gas, for example air, must be introduced under pressure, and the pressure obtaining upstream of the inlet duct is practically independent of the pressure fluctuations downstream produced by the turbulence of the viscous material in the mixing head.

It thus becomes possible to regulate the dose to be injected of the low viscosity liquid. An adjustment is made in the number of atomizers operating or in the pressure exerted on the liquid to be atomized. It is also possible to change an additive by changing an operating atomizer at any instant.

Moreover, the direct injection of the liquid into the mixing head through a small valve presents problems of obstruction resulting from the residues of the mixture which become hardened and which influence the flow rate by preventing the hermetic closure of the valve. Any additional valve therefore leads to maintenance problems and, as a consequence, the use of a number of valves to control the flow or to inject several additives becomes rather impractical.

Atomizers however being disposed in the inlet duct for the gas, do not come into contact with the mixture and there is therefore no disadvantage whatever in using a number of them to facilitate the injection of a number of additives, either successively or simultaneously. In addition, the introduction of the additive in the form of an aerosol makes possible a more intimate and rapid mixing than is obtainable by direct injection.

This may be of importance when introducing the liquid in solution, before it can evaporate in the gas and leave with this gas, since it is then no longer possible to regulate the dose. There is then an advantage in injecting the liquid with a low evaporation point into a high pressure cold gas, expanded while passing to the mixing head. The droplets in the gas are then well cooled at the instant at which they enter the mixture.

Other characteristics of the invention will become apparent from the following description.

In the attached drawings, given solely by way of example:

FIG. 1 shows the diagrammatic layout of an installation for producing polyurethane foam;

FIG. 2 shows a vertical sectional view through a mixing head used in this installation;

FIG. 3 is a vertical sectional view through the mixing head along the line A A' of FIG. 2; and FIG. 4 is a horizontal sectional view of the same mixing head.

The invention will be described below in its application to the production of polyurethane, but it is of course to be understood that it can be equally well applied to the production of other foams, such as epoxy foams or phenolic foams, or of other mixtures such as adhesives or paints, where the blowing-in of air is permissible or necessary.

Its application is also possible where a low viscosity liquid has to be mixed, at a small rigorously controllable flow rate, into a flow of a high viscosity liquid in turbulence.

The limits of the terms "low" flow rate and low or "high" viscosity are determined by the instant at which difficulties arise in achieving the proportioning necessary for the application envisaged.

The supply installation for the mixing head 1 is shown diagrammatically in FIG. 1. It comprises two supply reservoirs 2 and 3 for the basic constituents of the polyurethane. These constituents are well known. A first constituent is a polyurethane isocyanate and the other is a polyhydroxylated compound, generally a polyol resin.

These constituents can be obtained commercially, already containing the necessary additives for the production of polyurethane foam.

For the application of the invention, constituents are selected possessing a viscosity which enables the invention to be carried out, for example an isocyanate having a viscosity which can be maintained in the reservoir at between 15 and 400 centipoises approximately, and a polyol resin having a viscosity which can be regulated in the reservoir at between 500 and 15,000 centipoises, these values being given only as an example.

For this example, a polyol has been selected which is marketed by Bayer AG under the name "Desmophen DD 3004" and which has a viscosity of approximately 900 centipoises at 25°C and a density of 1, and an isocyanate marketed by the same manufacturer, under the name "Desmodur 44 VT" and which possesses a viscosity of approximately 25 centipoises and a density of 1.22. These constituents already contain some of the necessary additives.

There nevertheless exists a whole range of compounds and additives which can be used in this range of viscosities for producing a polyurethane; these are described in more detail in French Pat. No. 1,550,808.

The walls of the two supply reservoirs comprise heating elements 4, which enable the viscosity of the constituents stored to be regulated and which are controlled by a feedback temperature control device of well-known type (not shown).

Each reservoir is also provided with a helical mixer 5, driven by a motor 6 to maintain uniform temperature and viscosity throughout the whole reservoir. The reservoirs 2 and 3 are connected to the mixing head 1 by ducts 7 and 8, passing respectively through 2 axial-screw pumps 9 and 10, which serve to supply the liquids to the mixing head.

These pumps are driven by a single motor 11 through a transmission mechanism 12, for example to the gear or belt type.

The transmission ratio can be preadjusted, in order to vary the proportion of isocyanate to polyol resin according to the constituents utilized and the quantity of foam to be produced.

For 100 parts of polyol resin, the transmission ratio can be preadjusted in order to obtain for example from 30 to 120 parts of isocyanate for the viscosities mentioned above. In the example described here, the speed ratio is adjusted to give a flow of 39 parts of isocyanate per 100 parts of polyol resin.

The ducts 7 and 8 are connected to the mixing head 1 through inlet valves 14 and 15, which are normally closed, and which are opened by pneumatic means each time that a portion of product is discharged.

In order to prevent the constituents from cooling in the supply ducts during the period while the inlet valves are closed, and thereby to avoid irregularties in viscosity and discharge rate, recycling ducts 16 and 17 are provided for the supply ducts 7 and 8 respectively; these recycling ducts connect the point just upstream of each valve with the upper part of the corresponding reservoir, through flap valves 18 and 19.

This arrangement enables the liquids to be recycled during the closure period of the inlet valve, so that these liquids are maintained at the desired temperature and viscosity, even in the supply ducts.

The installation for supplying the mixing head 1 also comprises a compressed air reservoir 30, connected to a compressed air supply duct 25, through a pressure reducing valve 31 which regulates the pressure in the reservoir to about 5 atmospheres. This reservoir, which contains the air intended for producing turbulence in the mixing head 1 is connected to this mixing head through a duct 32 and an inlet valve 33, which opens each time that a portion of product is discharged.

The supply installation for the mixing head also comprises two reservoirs 23 and 24 for storing the low viscosity additives which, according to the invention, are injected by atomization.

The first reservoir contains water or a dye, while the other reservoir is used for storing a low boiling point hydrocarbon, possibly a fluorinated hydrocarbon.

In the present example, the reservoir 23 contains Freon 11, while the reservoir 24 contains water, the two additives constituting expanding agents having different effects. The reservoirs 23 and 24 are connected, firstly to the compressed air supply duct 25 via pressure-reducing valves 26 and 27 which regulate the pressure in the reservoirs to approximately 6 atmospheres and, secondly, to 6 atomizers disposed in the duct 32, the atomizers being fitted on their upstream side with valves 34 to 39, controlled by electromagnetic relay. These atomizers will be described in greater detail with reference to FIGS. 2 and 3.

Finally, a supplementary reservoir 40 is provided for a rinsing solvent; this is maintained at a pressure of approximately 5 atmospheres by the compressed air supply duct 25, through a pressure-reducing valve 40a.

Two ducts 41 and 42, leading into a common duct 43, are connected on to the upper part and the other to the lower part of the reservoir 40, and comprise valves 44 and 45 respectively. The common duct 43 is connected to the mixing head 1 through an inlet valve 46. The duct 41 serves for supplying compressed air from the space above the level of the solvent in the reservoir 40, and for feeding it to the common duct 43, while the duct 42 serves for drawing off solvent and supplying it also to this common duct.

The valves 44 and 45 are controlled by electromagnetic relays; these are used to supply either solvent or compressed air, or a mixture of both, to the mixing head 1, in order to flush it out from time to time to prevent hardening of the material which remains in the mixing head and to prevent obstruction or malfunctioning of the valves, 14, 15 or 33.

Figure 2:
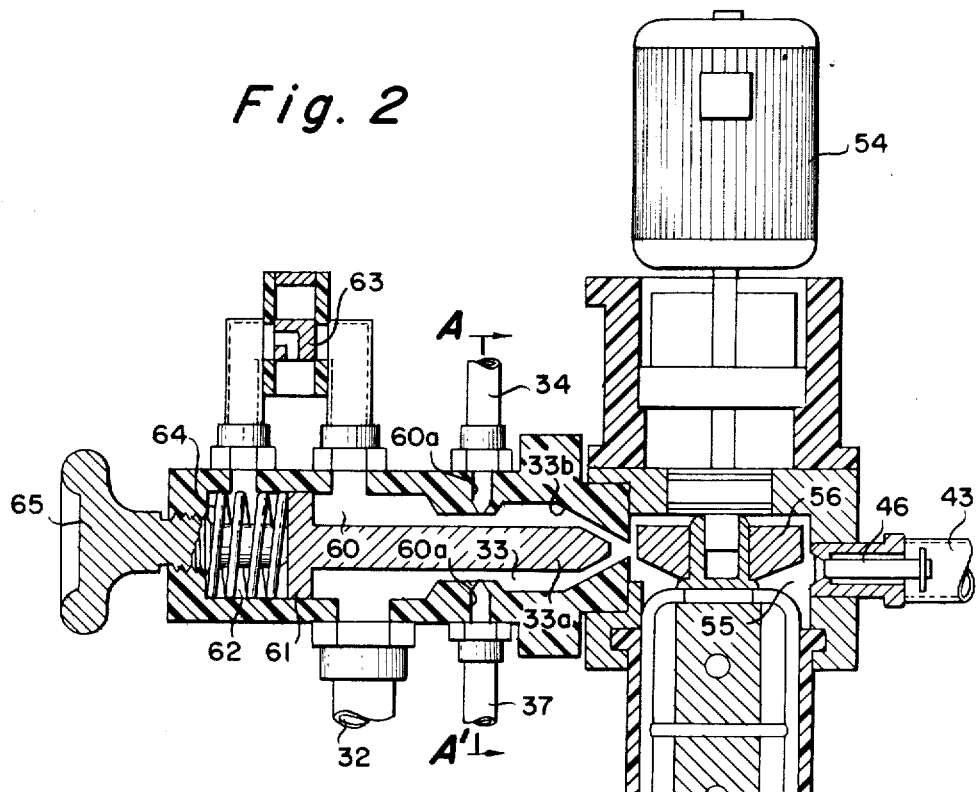

FIG. 2 shows a vertical section through the mixing head in a plane containing the compressed air supply duct 32 and the duct 43 for supplying flushing solvent and air. The inlet ducts for polyol resin and isocyanate are disposed on each side of the head, in the horizontal plane, and do not appear in this view.

The mixing head comprises a vertical cylindrical mixing duct 51, which terminates in a mixture ejection duct 52. In this cylindrical duct there is mounted a mixing turbine 53, rotationally driven about a vertical axis at a speed of approximately 3,600 r.p.m. by a motor 54. The upper part 55 of the cylindrical duct 51, into which the compressed air supply duct and solvent supply duct and the supply ducts for resin and isocyanate lead, comprises a small bladed turbine 56, which rotates integrally with the turbine 53.

The inlet valve 46 for the pressurized solvent feed has the form of a non-return flap valve, which remains closed under the action of the pressure obtaining in the mixing duct 51 and which opens only under the effect of the pressure of the solvent arriving through the duct 43.

In the body of the mixing head 1, there if formed a cylindrical compressed air inlet duct 60, which is connected at one of its ends to the compressed air supply duct 32 and discharges at its other end into the upper portion 55 of the mixing duct 51 through an orifice 33b, which is opened and closed by the horizontal movement of a needle 33a, this needle and the orifice constituting the valve 33 of FIG. 1.

The needle 33a is rigidly attached to a piston 61 sliding in the cylindrical duct 60; this piston, at its side remote from the needle 33a, forms an annular space 62 connected to the duct 60 through a piston valve 63, the position of which is controlled by electromechanical relay.

In one of its positions, this valve 63 connects the space 62 to the duct 60, whereas in the other position it connects the space 62 to atmosphere. A spring 64 is arranged in the annular space 62, while an abutment or stop 65, which can be adjusted by hand in its horizontal position, penetrates into this annular space.

In the first position of the valve 63, the pressures on the two faces of the piston 61 are equal, and the needle 33a under the action of the spring is pushed onto its seating and closes the orifice 33b. In the other position, the annular space 62 is at atmospheric pressure, while the pressure of approximately 5 atmospheres exerted on the opposite face of the piston 61 pushes this piston against the stop 65 and opens the orifice 33b. The air flow can be adjusted by the position of the stop 65.

Figure 3:
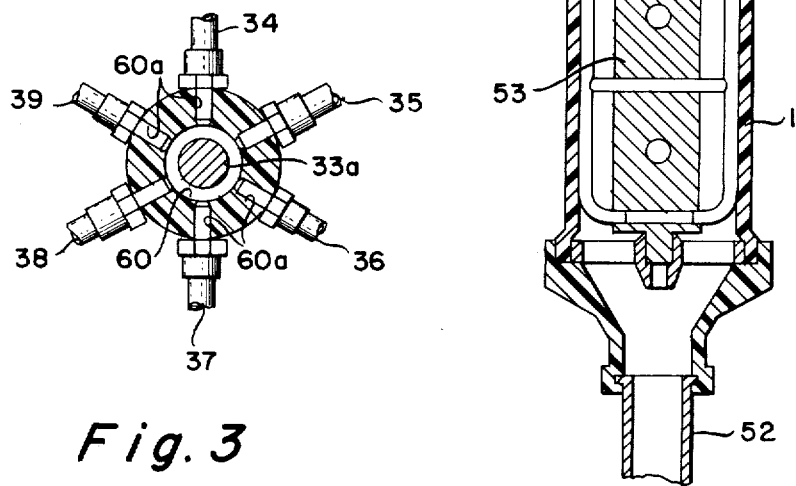

The cylindrical duct 60 also comprises, in its wall, six additive atomizing orifices 60a, which are each connected to one of the electromagnetic valves 34 to 39 (FIG. 1). These atomizing orifies 60a are formed radially in the same plane perpendicular to the axis of the cylindrical duct 60 and spaced angularly at 60°, as shown in FIG. 3.

Three of the orifices 60a are intended for atomizing water, and the other three serve for the Freon. The diameters of the three orificies which correspond to a given additive are calcuated so that, for the same pressure of liquid to be atomized, the second orifice discharges at twice the rate of the first and at half the rate of the third. Therefore, by selecting a suitable combination of diameters of orifices 60a, by means of the electromagnetic valves 34, 35 and 36 for water, and the valves 37, 38 and 39 for Freon (FIG. 1), it is possible to atomize at rates ranging from zero to 7 times the discharge of the first orifice.

The pressure of the liquids to be atomized, relative to the pressure of the compressed air, may be adjusted by means of the pressure-reducing valves 26, 27 and 31. In the case of the example described here, the pressure is regulated in such a way as to permit the orifices 60a to discharge precise doses situated in the ranges of from 0 to 14 parts of Freon and from 0 to 3 parts of water per 100 parts of resin, all the parts being calculated by weight.

Figure 4:
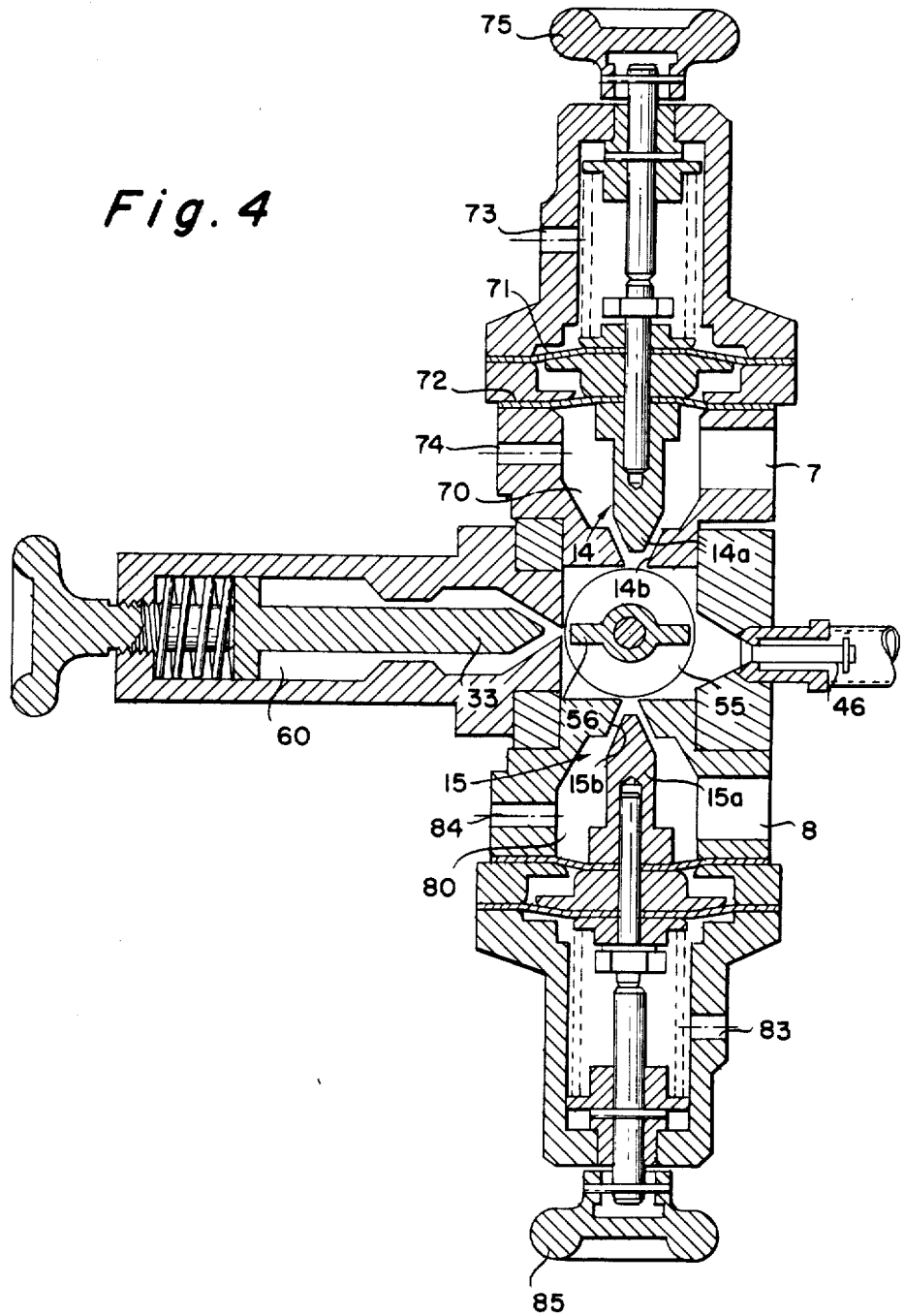

FIG. 4 shows a sectional horizontal view through the mixing head 1, at the level of the upper portion of the cylindrical mixing duct 51, which comprises the small-bladed turbine 56 and the orifices through which the ingredients enter the mixing duct 51. In this figure there can also be seen, in horizontal section, the compressed air inlet duct 60. It is also possible to see the ends of the inlet ducts 7 and 8 for polyol resin and the isocyanate, with their valves 14 and 15 respectively.

The polyol resin inlet duct 7 discharges into a cylindrical duct 70, which in turn discharges into the upper part 55 of the mixing duct 51, through an orifice 14b, the opening and closing of which are effected by the horizontal displacement of a needle 14a which, together with the orifice 14b provided in the body of the mixing head 1, forms the valve 14. The needle 14a is fixed to the centre of two domed flexible discs 71 and 72 which divide the duct 70 in a sealed manner into two parts. These flexible discs have two stable positions, in which they are domed in either the one or the other direction. In one of the positions, the needle 14a is pushed against orifice 14b and closes that orifice. In the other position, the needle 14a is retracted and opens the passage for the resin.

The parts of the duct 70 are connected respectively, through ducts 73 and 74, to a compressed air source; each duct comprises an electromagnetic valve (not shown), which serves to supply air pressure pulses. A pulse arriving through the duct 73 causes the flexible discs 71 and 72 to jump towards the closure position for the orifice 14b, while a pulse arriving through the duct 74 causes these discs to jump into their opposite opening position. The resin flow rate can be adjusted by the position of an abutment or stop 75.

The isocyanate enters the head 1 through a device identical with that which has just been described for the inlet for the polyol resin. It comprises a cylindrical duct 80, connected to the isocyanate inlet duct 8, and having an inlet orifice 15b, to the mixing duct 51, which can be opened or closed by means of a needle 15a, the orifice 15b and the needle 15a constituting the valve 15.

The needle 15a is operated by pressure pulses arriving through a duct 83 for the closure motion and through a duct 84 for the opening motion. The flow of isocyanate can be regulated by the position of an abutment or stop 85.

The electrical and electromagnetic elements which serve for operating the valve controlling the air pressure suplied through the ducts 73, 74, 83 and 84, for operating the piston valve 63 controlling the flow of compressed air into the mixing duct 51, and for operating the valves 34 to 39, which permit the ingress of the additives to be atomized, are shown on the figures. These elements are well known and it is known that they can be replaced by other analogous means, such as pneumatic relays, etc.

These electromagnetic elements are controlled from electrical switches arranged on the mixing head itself, or on a control panel which comprises the manometers and controls for the pressure-reducing valves, and for the temperature of the constituents. These switches may be operated by a program of the drum, card or perforated tape type regulating the sequences of the portions to be discharged.

The installation operates in the following manner. The reservoirs 2 and 3 are filled, one with the polyol resin, and the other with the isocyanate, into which the other additives, and possibly also the invariable portion of Freon and water, have already been diluted. The constituents are heated in the reservoirs to a constant temperature of approximately 25°C by means of the heating elements 4, regulated by a servo-control device, in order to obtain a viscosity of approximately 900 centipoises for polyol resin and 25 centipoises for the isocyanate. The motors 6 are started up so that the helical agitators 5 stir the materials to produce a uniform temperature in each reservoir. The reservoirs 23, 24, and 40 are then filled with Freon, water and solvent respectively, the filling of the reservoir 40 being restricted to a level just below the connection of the duct 41 to this reservoir.

The reservoirs are then pressurized, by regulating the pressure reducing valves connecting them to the compressed air supply duct 25. The pressure in the reservoirs 30 and 40 is adjusted to 5 atmospheres and the reservoirs 23 and 24 are adjusted to a higher pressure, of approximately 6 atmospheres, this difference of pressure serving for injecting the liquid into the pressurized air.

The transmission ratio of the motor driving the circulating pumps 9 and 10 is then preset to approximately 6 revolutions for the pump 9 for polyol resin, to 1 revolution of the pump 10 for isocyanate, in order to achieve a flow rate of approximately 39 parts of isocyanate per 100 parts of polyol resin.

The pumps are then started up and they recycle the liquid from the reservoir through the ducts 7 and 16, and 8 and 17 respectively, and through the flap valves 18 and 19. In this waiting position, all the cut-off valves are closed.

By pressing the necessary push-button controls, it is possible to carry out a number of production tests and to adjust the pressure in the reservoirs 23, 24 and 30, and the position of the stops 65, 75 and 85, so as to obtain a suitable mixture.

The production program can now be commenced. As a mould passes to beneath the mixing head, the motor 54, driving the mixing turbine, is started, the electromagnetic relays are actuated to open firstly the inlet valves 14 and 15 for the viscous constituents and then, when the mixing duct 51 has sufficiently filled up, to open the turbulent air inlet valve 33 and finally, when the air flow has become established, to open one or more of the valves 34 to 39 depending upon the quantity of water and Freon to be injected.

After the valves 14 and 15 have been opened, the pumps 9 and 10, instead of causing the liquids to recycle, deliver them through the corresponding inlet duct 7 or 8 and through the valves 14 and 15 into the upper part 55 of the mixing duct 51.

In this part, the liquids are mixed by the bladed turbine 56. While the resin and isocyanate continue to enter the mixing duct 51 the valve 33 is open and the turbulence air arrives, through the duct 32 and the cylindrical duct 60, into the mixing duct 51. In this duct, the compressed air breaks up into bubbles inside the mixture, thus increasing the turbulence and the interpenetration of the constituents, and it pushes the mixture into the lower part of the duct. In this lower part the turbine 53 continues to mix the constituents and the air, until the mixture is expelled through the ejection duct 52 into the mould situated below the mixing head 1.

However, immediately after the compressed air valve 33 has been opened, the electromagnetic relays are actuated to open one or more valves 34 to 39, depending upon the composition desired for this first portion.

The water and/or the Freon, as a result of the pressure difference between the liquid and the compressed air, enters the compressed air duct 60 in the form of small droplets in suspension in the air. It is this aerosol which enters the mixing duct 51 to produce turbulence there and to become broken up into bubbles.

In a conventional mixing device operating by direct injection of Freon into the mixing head, there is always a risk of a portion of the Freon evaporating in the turbulence air and leaving with this air in the ejection products of the mixture without having entered into suspension or into solution in the liquid. The greater the heat released by the mixture at the commencement of the chemical reaction, the greater this risk will be.

Freon 11 is moreover a compound possessing a low evaporation point of approximately 22°C, which has been properly selected to evaporate under the effect of the head released by the chemical reaction to form the bubbles in the polyurethane foam. It is therefore necessary for the Freon not to evaporate too soon. Other "Freons" could possibly be used, but their properties would have to be considered to determine their suitability in the particular process. In this specification, the term Freon is used to refer specifically to "Freon 11" unless otherwise stated.

In the device according to the invention however, the air at a pressure of 5 atmospheres, which is the vehicle for the Freon droplets, expands abruptly as it enters the mixing duct 51 thus leading to cooling of these droplets. In addition, the distribution of the Freon into fine droplets in air bubbles which are mixed in the viscous liquid insures rapid entry into solution of the Freon.

It has in fact been found that the Freon does not evaporate prematurely in the device according to the invention.

Very intimate mixing is thus achieved between the water and the Freon in the viscous mass undergoing reaction, thus insuring high uniformity in the dimensions of the bubbles in the foam produced.

After the first portion of mixture having a volume determined by the opening period of the valves 14 and 15 have been ejected, the electromagnetic relays are operated to close all the valves except for the compressed air inlet valve 33. Pure pressurized air is then delivered into the mixing duct 51 to clean the compressed air inlet orifice 33b which opens into the mixing duct 51. Thus, the valve 33 does not need any supplementary maintenance to prevent it becoming blocked by the residue of the hardened mixture. Moreover, the compressed air assists in cleaning the mixing duct 51 and turbine 53 and in expelling all the residues towards the exit duct 52, from which these residues are then ejected into the mould.

Finally, the electromagnetic relay controlling the valve 33 is actuated to close any compressed air inlet into the mixing duct 51.

The mould containing the mixture dose is closed and the mass starts to react, forming a polyurethane foam. This foam hardens and fills the entire mould. This mould may have the shape, for example, of a cushion.

During the process, a succeeding mould is passed into position below the mixing head 1. This mould may correspond to a foamed object which is not identical to the first one. For example, the production program may demand a lower density, it being possible for the object to be, for example, a less dense cushion.

The programmer operating the electromagnetic relays for opening the valves 34 to 39 must therefore select another combination of the opening periods of these valves, in order to admit a stronger dose of Freon or water into the mixture, according to the density and hardness which are required.

The operating cycle for the inlet valves 14, 15 and 33 wil be strictly the same, except for the duration of opening of these valves which depends upon the volume to be discharged and except for the combination of opening periods for the valves 34 to 39. Thus, each mould which passes below the mixing head 1 can receive a suitable proportion of an appropriate composition.

The apparatus is therefore adapted for supplying successive portions of mixture possessing compositions which vary form one portion to another.

Before ceasing operations, the mixing head 1 must be thoroughly cleaned to prevent the residual material from hardening in it. For this purpose, the electromagnetic controls for the valves 44 and 45 are actuated in order to open these valves.

A mixture of solvent and compressed air is then delivered through the flap valve 46 into the mixing head 1 to clean and flush out its interior. This valve is of the non-return type. Finally, the valve 45 can be closed so as to deliver a final pure air jet to dry everything out. The cycle is then completed after closing the valve 44.

Although the invention is particularly applicable to the production of polyurethane foam it is clear that it is not restricted either in respect of the nature of the constituents used or of their number, where the problem arises of mixing a small and exact dose of a low viscosity liquid into another high viscosity liquid, the turbulence of which prevents regulation of the rate of flow at inlet of the low viscosity liquid.

This problem can arise in the injection of catalysts, of coloring matter and of any low viscosity additive for which the proportions are estremely important and must be capable of being adjusted from one portion to another.

Neither is the invention restricted to the values of the flow rates and viscosities which have been given above solely by way of example, nor to the means for bringing the constituents together and mixing them, provided that there exists an introduction under pressure of a gas in which the low viscosity additive is present in the form of an aerosol.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. An apparatus for introducing and mixing liquids of various viscosities comprising:
    a. a mixing head having a mixing chamber,
    b. mixing means in said mixing chamber,
    c. a first inlet means for said mixing chamber for injecting a high viscosity first liquid into said mixing chamber on demand including first controlled inlet valve means,
    d. a second inlet means for said mixing chamber for injecting an atomized low viscosity second liquid into said mixing chamber on demand,
    e. said second inlet means including an atomizing chamber immediately adjacent said mixing chamber and connected directly thereto by an inlet orifice in the wall of said mixing chamber,
    f. second controlled inlet valve means in said atomizing chamber for closing said inlet orifice,
    g. a plurality of inlet orifices radially disposed in the wall of said atomizing chamber selectively controllable for injecting said second liquid into said atomizing chamber on demand including a controlled valve member for each of said inlet orifices,
    h. gas inlet means in the wall of said atomizing chamber for injecting compressed gas into said atomizing chamber for atomizing said second liquid in said atomizing chamber.

2. An apparatus as in claim 1 and including:
    a. a third inlet means for said mixing chamber for injecting a high viscosity third liquid into said mixing chamber on demand including third controlled inlet valve means.

3. An apparatus as in claim 2 and wherein:
    a. said first, second and third inlet means are circumferentially disposed around said mixing chamber.

4. An apparatus as in claim 3 and wherein:
    a. said first, second and third inlet means all lie in a single plane intersecting said mixing chamber.

5. An apparatus as in claim 4 and including:
    a. a fourth inlet means for said mixing chamber for injecting a cleaning solvent into said mixing chamber on demand including controlled valve means and lying in said single plane.

6. An apparatus as in claim 1 and including:
    a. means for recycling said first fluid.

7. an apparatus as in claim 1 and wherein:
    a. said mixing means includes a plurality of spaced agitators.

* * * * *